No. 780,365. Patented January 17, 1905.

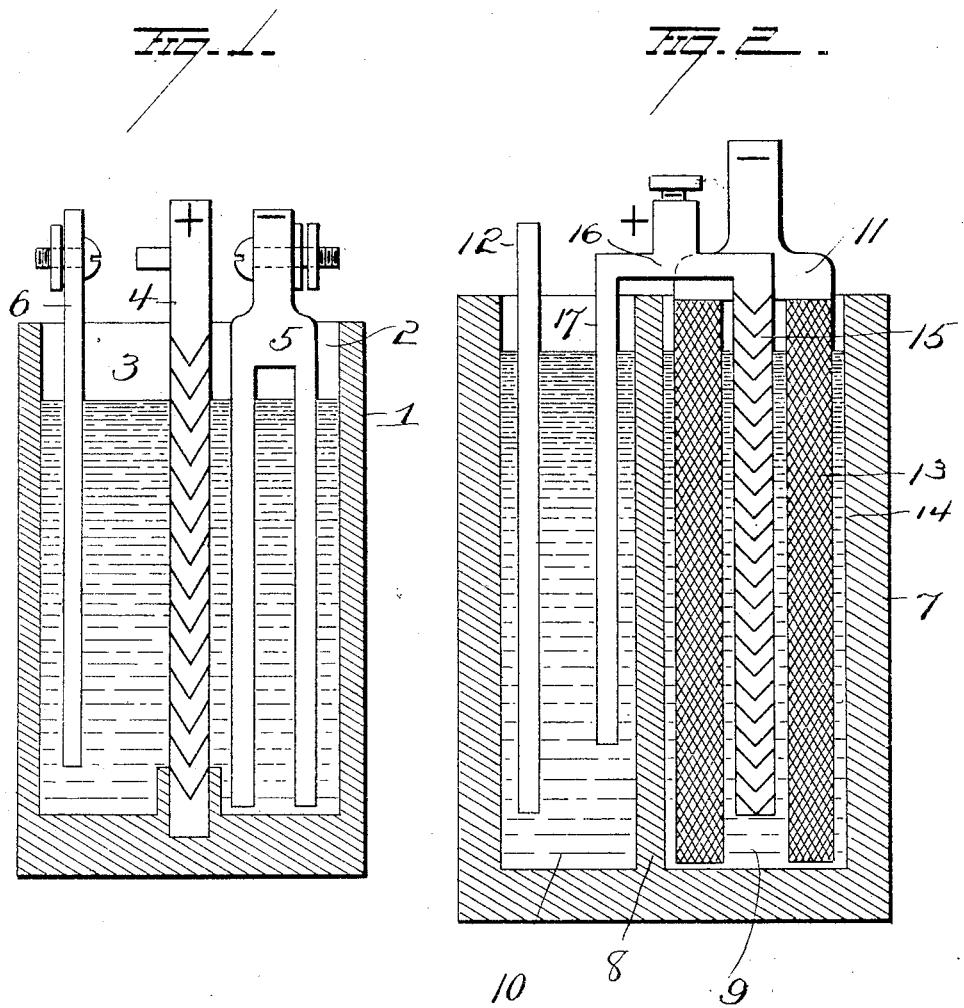

UNITED STATES PATENT OFFICE.

JOSEPH MELZER, OF CLEVELAND, OHIO, ASSIGNOR TO THE OSBORN-MORGAN COMPANY, OF CLEVELAND, OHIO.

STORAGE BATTERY.

SPECIFICATION forming part of Letters Patent No. 780,365, dated January 17, 1905.

Application filed April 2, 1904. Serial No. 201,280.

*To all whom it may concern:*

Be it known that I, JOSEPH MELZER, of Cleveland, in the county of Cuyahoga and State of Ohio, have invented certain new and useful Improvements in Storage Batteries; and I do hereby declare the following to be a full, clear, and exact description of the invention, such as will enable others skilled in the art to which it appertains to make and use the same.

My invention relates to improvements in storage batteries, the object of the invention being to produce a storage battery which can be charged from a source of either direct or alternating electric current.

With this object in view the invention consists in certain novel features of construction and combinations and arrangements of parts, as hereinafter set forth, and pointed out in the claims.

In the accompanying drawings, Figure 1 is a view in section of a cell illustrating one embodiment of my invention, and Fig. 2 is a similar view showing another form of construction by means of which the invention can be carried into effect.

The phenomenon that aluminium as an anode offers to the current a large resistance is utilized in the construction of my improved storage battery. In the ordinary rectifier a large percentage of efficiency is lost by heat, and consequently a variable internal resistance is encountered. To meet this difficulty and to render it possible that the accumulator can be charged from a source of direct or alternating current constitute the principal aims of my present invention.

In the construction shown in Fig. 1 the cell or jar of suitable insulating material is indicated at 1. The cell 1 is divided into two independent compartments 2 and 3 by means of a plate 4, of lead, which also constitutes the positive-pole electrode. The compartments 2 and 3 are filled with dilute sulfuric acid. In the compartment 2 a lead negative-pole electrode 5 (preferably bifurcated) is immersed in the electrolyte. An aluminium electrode 6 is similarly immersed in the electrolyte in the compartment 3 of the cell. When the cell is to be charged with a direct current, the aluminium electrode 6 will be cut out of circuit by means of any suitable switch (not shown) and the positive and negative pole electrodes 4 and 5 will be connected with the generator and the battery charged in the usual way.

If an alternating current only is accessible, one terminal is connected to electrode 5 and the other terminal is connected to aluminium electrode 6, while electrode 4 is unconnected, forming a bipolar electrode during the charging operation. The action of the battery will now be to rectify the alternating current and at the same time the battery will be charged. In discharging the battery the aluminium electrode will be excluded from the circuit.

In the construction shown in Fig. 2 the cell 7 is divided by a central partition 8 into two independent compartments 9 and 10, in each of which sulfuric acid is placed. A lead negative-pole electrode 11 is immersed in the electrolyte in compartment 9 and an aluminium electrode 12 is immersed in the electrolyte in compartment 10. The lead electrode 11 preferably comprises two members 13 14, between which one member, 15, of a lead positive-pole electrode 16 is disposed, the other member, 17, of said positive-pole electrode being immersed in the electrolyte in the compartment 10 of the cell. The operation of this cell is precisely the same as that of the cell shown in Fig. 1.

Having fully described my invention, what I claim as new, and desire to secure by Letters Patent, is—

1. A self-contained electric-current rectifier and accumulator.

2. A self-contained storage battery and electrolytic rectifier.

3. A storage battery comprising a cell having independent compartments, an electrolyte in each compartment, and two electrodes in each compartment, one of said electrodes being aluminium and the others of a different metal.

4. A storage battery comprising a cell having independent compartments, an electrolyte in each compartment, two electrodes in each compartment, one of said electrodes being aluminium and the others being lead.

5. A storage battery comprising a cell, an electrode dividing said cell into independent compartments, an electrode of a similar metal in one of said compartments, an aluminium electrode in the other compartment and an electrolyte in each compartment.

6. A storage battery comprising a cell having two independent compartments, sulfuric-acid electrolyte in each compartment, two lead electrodes in one compartment and an aluminium electrode and a lead electrode in the other of said compartments.

In testimony whereof I have signed this specification in the presence of two subscribing witnesses.

JOSEPH MELZER

Witnesses:
H. C. OSBORN,
W. A. OSBORN.